Patented June 10, 1952

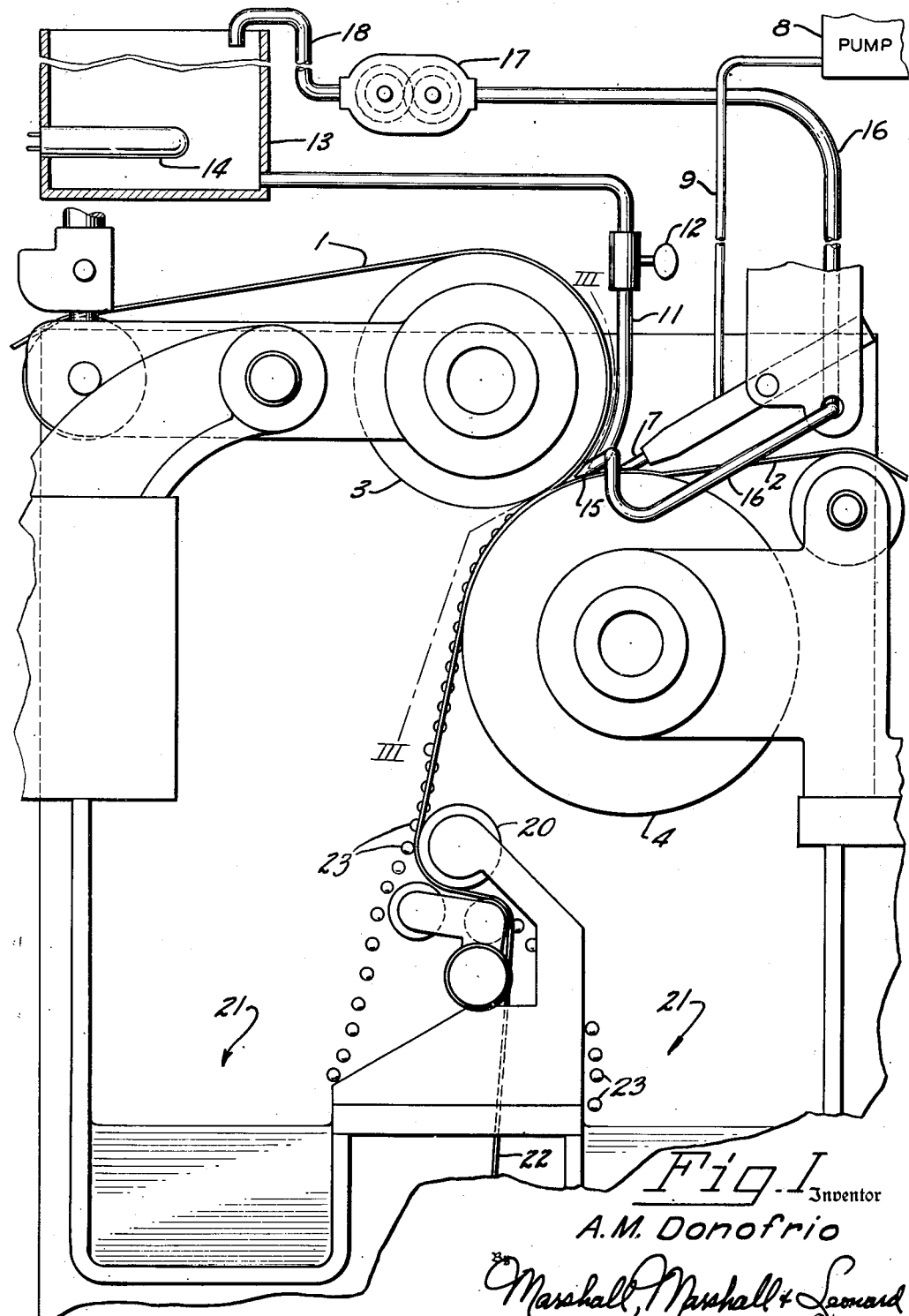
Fig. I
Inventor
A. M. Donofrio
Marshall, Marshall & Leonard
Attorneys

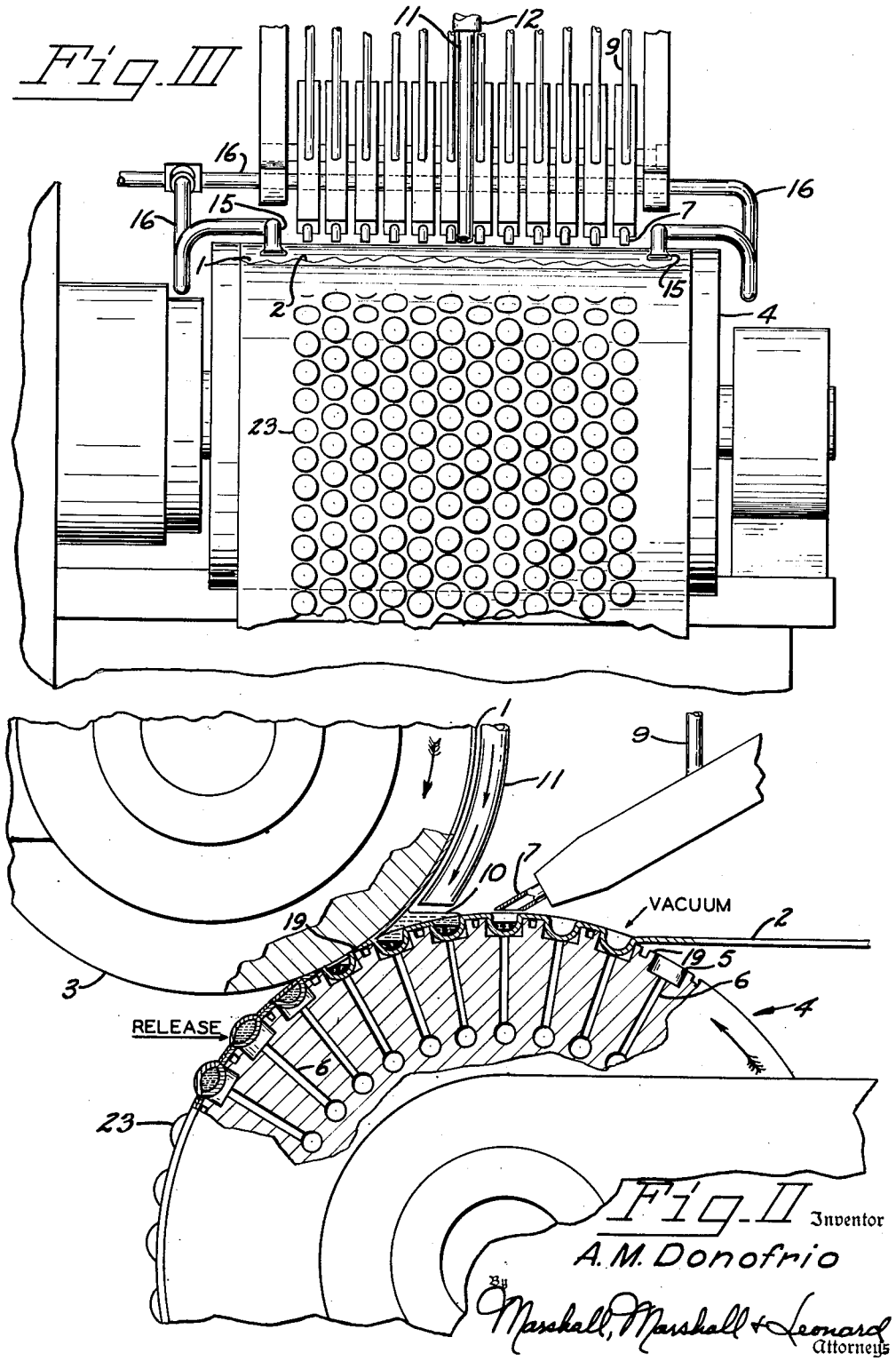

2,600,222

UNITED STATES PATENT OFFICE 2,600,222

METHOD OF AND APPARATUS FOR ENCAPSULATING SUBSTANCES

Alfonso M. Donofrio, Toledo, Ohio, assignor, by mesne assignments, to American Cyanamid Company, New York, N. Y., a corporation of Maine Application December 30, 1949, Serial No. 135,983

13 Claims. (Cl. 18—21)

1

This invention relates to methods of and apparatus for encapsulating substances such as pharmaceuticals, medicines or other liquid or semi-liquid substances which it is desired to administer or use in relatively small measured quantities. More particularly the present invention relates to an improvement in methods and apparatus for implacing the substances to be encapsulated within the capsulating material such as, for example, edible gelatin.

In my copending application Serial No. 718,527, now Patent No. 2,513,852, I disclose a method and apparatus for the formation of symmetrical, generally ellipsoidal capsules from two sheets of resilient capsulating material in which only one of the two sheets of material is pocketed, the other sheet being used merely as a cover for the pockets and being placed over the pockets after a measured quantity of a solution of the material to be encapsulated has been deposited in the pockets. The prior art in the field of encapsulating, as exemplified by the patents to Scherer, No. 1,970,396, and to Pittenger, No. 2,219,578, contains machines and methods for forming symmetrical, generally ellipsoidal or spherical capsules from two sheets of capsulating material, such as edible gelatin, in which half capsule pockets are formed in each of the sheets, the pockets are filled with substance to be encapsulated, are juxtaposed and then are sealed. In all of these prior art devices it was contemplated that the substance to be encapsulated would be a homogeneous solution in liquid or semi-liquid form containing a selected concentration of active ingredients which might be combined in solution with any one of numerous compatible inactive carriers or fillers.

In the manufacture of pharmaceutical or medicinal capsules, for example, the active ingredients are, for the most part, of such potency that a capsule containing solely active ingredients would be too small for convenient handling. Therefore, pharmaceutical manufacturers usually prepare solutions containing the desired concentration of active ingredients. These solutions are placed in the capsulating machine and each capsule is charged with a measured amount of solution. Thus the finished capsule would contain, for example, ten minims of a solution which would be 50% active vitamin concentrations, and 50% inert ingredients such as vegetable oils, vegetable shortening, mineral oils or other substance.

In the Scherer capsulating machine as shown in Patent No. 1,970,396, for example, this method of implacing the substance to be encapsulated gave rise to a disadvantage which caused considerable waste of the solution and thus of the active ingredients to the extent in which they were concentrated in the solution. In the Scherer machine and in similar machines, an indefinite quantity of the solution would always escape from the confines of the pockets and be spread over the surfaces of the sheets of gelatin extending between the pockets. The active ingredients contained in the solution would be lost when the web of encapsulating material out of which the capsules were formed was returned to the encapsulating material supply source or otherwise disposed of. In the Pittenger machine an even greater loss of expensive active ingredients resulted because in that machine the two sheets of gelatin formed opposite sides of a pool of substance to be encapsulated, the pockets being formed in the sheets while submerged in the pool of solution and being sealed together before leaving the pool of solution. Thus, inevitably, a considerable quantity of material would also be entrapped between the opposed sheets of gelatin in the area from which capsules were not formed.

It is the principal object of this invention to provide a method for filling capsules with pharmaceutical or other substances in which any loss occurring during the encapsulating process will be confined to the inexpensive inert carrier substances which are used solely to add volume to the capsules, which are inexpensive and the loss of which, therefore, is relatively unimportant.

It is another object of this invention to provide apparatus so designed as to permit capsules to be formed containing a measured charge of active ingredients and a sufficiency of inactive ingredients to result in the finished capsules containing a predetermined quantity and concentration of active ingredients and wherein the two substances, i. e., active ingredients and inert carrier are separately introduced into the capsules as they are formed.

It is a further object of this invention to provide apparatus by means of which the apparatus disclosed in my copending application Serial No. 718,527 and in my copending application Serial No. 126,026 (which is a division of the first mentioned application) can be modified to employ the method of filling capsules which constitutes a portion of the instant invention.

Other and more specific objects and advantages will be apparent from the drawings in which:

Figure I is a fragmentary somewhat diagrammatic illustration showing apparatus on which the method of the instant invention can be carried out and which apparatus in itself also constitutes one part of the instant invention.

Figure II is a fragmentary, enlarged, detailed, view, partly in section, showing the operation of the apparatus illustrated in Figure I in carrying out the process constituting part of the instant invention.

Figure III is a fragmentary view partly in elevation and taken substantially on the line III—III of Figure I.

In an encapsulating machine embodying the invention from an apparatus standpoint, and by means of which the method constituting a part of the invention can be carried out, there exists a source of supply for two sheets of capsulating material 1 and 2. If the substance to be encapsulated is for internal administration, either to humans or animals, the capsulating material employed should be an edible substance and, most generally, is edible gelatin. Where the substance to be encapsulated is not taken internally, it may be encapsulated in any resilient, heat-fusible material which is not soluble in the content substance but which is frangible or soluble in other materials to permit the release of the content substance when desired. In accordance with the teachings of my copending applications, the two sheets of capsulating material 1 and 2 are fed over the surfaces of a pair of rollers 3 and 4 which are mounted upon parallel axes, rotated in opposite directions and have their peripheries in contact throughout their length. The roller 3 has a smooth surface whereas the roller 4 is a die roll, the surface of which is formed with a plurality of pockets 5 which may be cylindrical or semi-spherical or semi-elliptical depending upon the desired shape of the finished capsule. Each of the pockets 5 is in communication by means of a passageway 6 with an exhaust or vacuum manifold (not shown) which applies exhaust to each pocket when it reaches the position indicated by the word "vacuum" and arrow in Figure II. Inasmuch as the sheet of gelatin 2 in at this point overlying the pockets 5 which extend along in axial rows on the surface of the roller 4, and since the capsulating material is resilient, it is drawn downwardly into the pockets 5 where it takes either a semi-spherical or semi-elliptical shape of definite volume depending upon the precise shape and size of the pocket. In the apparatus illustrated in the drawings, each of the pockets is cylindrical in shape so that when the capsulating material 2 is drawn downwardly semi-spherical pockets are formed therein.

As the two rollers 3 and 4 rotate in the directions shown by the arrows in Figure II, each pocket passes beneath the lower end of one of a plurality of charging needles 7, each of which is in line with one of the circumferential rows of pockets 5 and which are all in line with each other, extending longitudinally across above the periphery of the die roll 4. The lower ends of each of the needles 7 may be beveled as shown in order to permit the openings in the ends of the needles to lie closer to the surface of the capsulating material 2 as it lies on the periphery of the die roller 4. As each of the pockets in an axial row of pockets passes beneath the set of needles 7, a pump (generally indicated by the reference number 8 in Figure I) discharges a measured quantity of an active ingredient concentrate through feeding pipes 9 each of which leads to one of the needles 7.

The concentrate (which is shown in heavy lines in Figure II) may be pure active ingredients or it may be a concentrated solution of active ingredients but in any event, it will be active ingredients in much greater concentration than that desired in the finally finished capsule. If the active ingredients are such that they can be isolated and are of such potency that a charge of sufficient size to be handled with accuracy should be contained in each of the finished capsules, then the concentrate may be pure, i. e., may consist solely of active ingredients. If, on the other hand, as is the case with most pharmaceutical materials for example, and in particular vitamins, the active ingredient in the finished capsule is a mixture of substances or a substance of extremely high potency so only a minuscule amount should be contained in each finished capsule, then the concentrate deposited as the pockets pass beneath the needle 7 will be a solution of these active ingredients in a compatible carrier. In any event, however, the charge deposited by the needle 7 will be only a fraction of the total volume of the finished capsule and, as will later appear, should be small enough in total volume to eliminate any possibility of spilling or splashing out of the pockets during their further progression and before they are finally sealed.

As the die roll 4 continues to rotate, each of the sheet material lined pockets which has been charged by its corresponding needle 7 moves on until it enters the area covered by a small pool or bath of inert, compatible liquid 10 which is maintained in the V formed by the converging sheets 1 and 2 of capsulating material as they lie on the surfaces of the rollers 3 and 4. The liquid 10 must be a liquid which is compatible with the concentrate already deposited in the capsule and preferably should be a liquid of relatively low viscosity so that it will flow easily into the pockets 5. In order that the finished capsules shall have the best appearance, the liquid should also be one in which the concentrate either is soluble or which has approximately the same color as the concentrate so that no stratification will appear in the finished capsules. If, however, the concentrate and the inert carrier or filler are not of the same color or are not soluble one in the other, the stratification may be hidden by employing relatively opaque capsulating material. This can be achieved either by dyeing the capsulating material to a dark color or by employing capsulating material having a natural dark color. Inasmuch as consumers of pharmaceuticals, at least, appear to prefer light colored gelatin on the edible capsules, care should be taken that the concentrate and filler be approximately the same color and have approximately the same degree of translucency thus achieving a finished capsule of pleasing appearance.

The pool or bath of liquid 10 is maintained in the converging space between the two sheets of capsulating material 1 and 2 by a supply tube 11 and its rate of flow controlled by a valve 12 located in the tube 11 which leads from a supply tank 13. The supply tank 13 may be heated, as by a heater 14, and most easily can be located above the level of the discharge tube 11 so that gravity causes the liquid to flow. The depth of the liquid in the pool 10 is so selected as to insure an excess supply being present at all times since it is relied upon to flow into the pockets formed in the capsulating material 2 excluding air therefrom and completely filling these pockets as they are passed through the pool. In order to insure a continuous supply of the liquid in the pool 10 of sufficient quantity to fill all of the pockets, the rate of flow from the discharge pipe 11 is selected to be greater than that necessary to fill the pockets and to maintain the pool. The excessive liquid flows longitudinally along in the crevice between the sheets 1 and 2 until it approaches the ends of the rollers 3 and 4. At each end of the crevice there is located an exhaust nozzle 15, both of which are connected by pipes 16 to a pump 17 which discharges through a pipe 18 back into the tank 13. The rate of exhaust of the pump 17 is considerably in excess of the rate of "overflow" of the liquid in the crevice between the sheets of encapsulating material. Thus the exhaust nozzles 15 act to suck up any of the liquid which flows beyond the end rows of pockets and to prevent it from spilling over the edges of the rollers.

In addition to its function for filling the pockets and excluding air therefrom, the liquid in the pool 10 serves the purpose of coating the surface of the capsulating material and facilitating its subsequent sealing. Most materials suitable for capsulating are heat-fusible and are sealed by head and pressure. Thus if the gelatin or other capsulating material has a tendency to cool too rapidly under its particular environment to permit a good seal, the liquid in the bath 10 may serve the additional function of heating the capsulating material right up to the point where the two sheets are sealed together, insuring satisfactory air and liquid tight sealing of the finished capsules. It may be desirable, therefore, for the liquid in the bath 10 to be introduced therein at a considerably elevated temperature, achieved by the heater 14 in the tank 13.

As the rollers 3 and 4 continue to rotate the pockets in the sheet 2 which are now completely filled with the two substances, i. e., the concentrate and the filler or inactive material, pass between the two surfaces of the two rollers and the sheet 1 of capsulating material is laid over the filled pockets, pressed tightly against the sheet 2 around the margins of the filled pockets and severed around the edges of the sealed portions by lips 19 extending around each of the pockets, which pinch off the capsulating material between the surfaces of the lips and the surface of the smooth roller 3 thus forming the capsules 23. As the rollers continue to rotate the web of capsulating material around and between each of the closed capsules carries the capsules on and as the pocket reaches the position indicated by the word "release" and the arrow in Figure III, the vacuum in the passageway 6 is released so that it no longer holds the capsules 23 in the pockets 5 and, since the capsulating material is resilient, restoring forces in the sheet 2 act through the substance contained in the capsules until the forces tending to contact the sheet 2 are counterbalanced by pocketing the sheet 1 to an equal degree, resulting in symmetrical, generally ellipsoidal capsules which are carried on around the roller 4 by the tackiness of the web. The web leaves the surface of the roller 4, as is best shown in Figure I, and passes over and between several stripping rollers, generally indicated by the reference numeral 20, where the capsules 23 are squeezed out of the web and fall downwardly into troughs 21 which collect them for subsequent packaging. The perforated web 22 is carried downwardly and away either to be returned to the source of capsulating material where it is remelted and reformed into sheets or to be otherwise disposed of.

The relative volume of each of the charges of concentrate deposited by the needle 7 and of the capsules themselves is predetermined not only to result in finished capsules of definite volume and concentration of active ingredients but also so that as the upwardly open pockets in the sheet 2 of capsulating material are moved around on the surface of the roller 4, none of the expensive concentrate spills from the pockets and, as they pass into the bath 10 each of them is filled from the bath with the filler or inactive substance. Before the capsule pockets are filled to such an extent that the concentrate would spill therefrom, even if it were of low viscosity, the individual capsules are closed by the covering sheet 1 of capsulating material. The only substance which ever contacts the sheets between individual pockets is the inexpensive liquid maintained in the bath and, therefore, the loss of substance which inevitably occurs by its being spread over the surfaces of the sheets between capsules does not involve any loss of the costly active ingredients.

Although apparatus for the performing of the method embodying the instant invention is completely disclosed in the drawings, it is to be appreciated that other apparatuses may be employed in carrying out the method of the instant invention. Similarly, apparatus embodying the instant invention may be mounted as an accessory or as an improvement on the apparatus disclosed in my copending applications or on the apparatuses in prior art patents and employed in prior art methods. The concept of the instant invention comprises the novel method of filling capsules in such a manner that there is no risk of the active, expensive substances being lost and where losses occur only in the inexpensive filler materials. Methods of accomplishing this objective and carrying out the teachings of the invention are set forth in the following claims as are the essential features of apparatus designed in accordance with the instant invention.

Having described the invention, I claim:

1. A method of manufacturing capsules each containing a predetermined concentration and quantity of active ingredients and an inert carrier therefor, that comprises forming pockets of definite volume in a sheet of capsulating material, partially filling said pockets by placing a measured charge of active ingredient in each of said pockets, passing said partially-filled pockets beneath a supply of inert liquid carrier which flows into said pockets completing the filling thereof, closing said pockets with a second sheet of capsulating material, sealing the two sheets of capsulating material together around the margins of the filled pockets, and separating the capsules thus formed from the residual portions of the sheets of capsulating material.

2. A method of manufacturing capsules each containing a predetermined concentration and quantity of active ingredients and an inert carrier therefor, that comprises forming pockets of definite volume in a sheet of capsulating material, partially filling said pockets by placing a measured charge of a solution of active ingredients of known concentration in each of said pockets, passing said partially filled pockets beneath a supply of inert liquid carrier which flows into said pockets completing the filling thereof, closing said pockets with a second sheet of capsulating material, sealing the two sheets of capsulating material together around the margins of the filled pockets, and separating the capsules thus formed from the residual portions of the sheets of capsulating material.

3. A method of manufacturing capsules each containing a predetermined concentration and quantity of active ingredients and an inert carrier therefor, that comprises forming pockets in a sheet of capsulating material, depositing a measured charge of active ingredients of known concentration in each of said pockets, depositing a known charge of inert filler in each of said pockets, the combined charges resulting in the preselected total quantity and concentration of active ingredient, closing said pockets around the substances deposited with a second sheet of capsulating material, sealing the two sheets of capsulating material together around the margins of the filled pockets, and separating the capsules thus formed from the residual portions of the sheets of capsulating material.

4. A method of manufacturing pharmaceutical and the like capsules from two sheets of resilient edible gelatin that comprises forming pockets of definite volume in at least one of said sheets of gelatin, depositing a measured charge of active medicament less in volume than one of said pockets into each of said pockets, moving said sheet and partially filled pockets through a maintained bath of an edible inert liquid compatible with the medicament, closing said pockets while within the bath with the second sheet of gelatin and sealing the two sheets of gelatin together around the margins of the pockets, entrapping within each of said closed pockets a quantity of inert liquid equal to the volume of the pocket less the volumes of the charge of medicament.

5. A method of manufacturing pharmaceutical and the like capsules from two sheets of resilient edible gelatin that comprises forming pockets of definite volume in at least one of said sheets of gelatin, depositing a measured charge of active medicament less in volume than one of said pockets into each of said pockets, moving said sheet and partially filled pockets and the second sheet of gelatin into converging paths, continuously maintaining a bath of an inert liquid compatible with said medicament in the narrowing space between the converging sheets of gelatin, sealing the two sheets of gelatin progressively around the margins of said pockets as each of said pockets leaves the bath upon convergence of their paths of movement while maintaining said sheets of gelatin against further distortion, thereby trapping a determined volume of liquid in each of said pockets with the medicament, and severing the sealed capsules from the sheets of gelatin around the edges of the marginal seals.

6. Apparatus for producing capsules each containing a predetermined concentration and quantity of active ingredient comprising, in combination, means for feeding two sheets of resilient capsulating material along converging paths and into contact with each other, means for deforming defined areas of at least one of said sheets to form pockets of definite volume, means for partially filling said pockets with measured charges of active ingredient of known concentration, means for maintaining a pool of inert liquid compatible with said active ingredient in the space between the converging sheets of capsulating material and at a depth at least sufficient to cover and fill each partially filled pocket while passing therethrough, means for sealing said sheets of capsulating material together while still within said pool and means for severing the sealed capsules thus formed from said sheets of capsulating material.

7. Apparatus for producing capsules each containing a predetermined concentration and quantity of active ingredients comprising, in combination, a pair of rollers having parallel axes and contacting peripheries and means for rotating said rollers in opposite directions, at least one of said rollers having a plurality of die-pockets in its periphery all of the same size and volume, means positioning said one roller partially below and partially under the other roller, means for feeding a sheet of resilient capsulating material over the periphery of each of said rollers and into convergence therebetween, means for depressing said sheet of capsulating material into said die-pockets to form pockets of definite volume therein, means for depositing a measured charge of active ingredient less in volume than one of said pockets into each of said pockets, and means for filling said pockets with an inert substance compatible with said active ingredient, said pair of rollers also serving to seal said sheets of capsulating material together around the margins of the filled pockets and sever the thus formed capsules from the sheets of capsulating material.

8. Apparatus for capsulating substances comprising, in combination, a pair of rollers having parallel axes and contacting peripheries, at least one of said rollers having a plurality of die-pockets in its periphery, means positioning said one roller partially below and partially under the other roller, means for feeding a sheet of capsulating material over the surface of each of said rollers and into contact with the other of said sheets of capsulating material between said rollers, means for depressing said capsulating material into said die-pockets and thus forming pockets therein of definite volume, feeder means for depositing a measured charge of active substance into each of said pockets, means for filling each of said pockets with a liquid compatible with said active substance, said pair of rollers also serving to seal said sheets of capsulating material together around the margins of the pockets and sever the thus formed capsules from the sheets of capsulating material.

9. Apparatus for capsulating substances comprising, in combination, a pair of rollers having parallel axes and contacting peripheries, at least one of said rollers having a plurality of die pockets in its periphery, means positioning said one roller partially below and partially under the other roller, means for feeding a sheet of capsulating material over the surface of each of said rollers and into contact with the other of said sheets of capsulating material between said rollers, means for depressing said capsulating material into said die pockets and thus forming pockets therein of definite volume, feeder means for depositing a measured charge of active substance into each of said pockets, means for maintaining a pool of a liquid that is compatible with said active substance in the converging space between said sheets of capsulating material, said pool of liquid being at a level such that it contacts said pockets after the deposition of said active material, said pair of rollers also serving to seal said sheets of capsulating material together around the margins of the filled pockets and sever the thus formed capsules from the sheets of capsulating material.

10. In a capsulating machine having means for moving two sheets of resilient capsulating material along converging paths and into contact with each other, means for forming pockets of definite volume on at least one of said sheets for the reception of substance to be encapsulated and means for sealing said sheets of capsulating material together around the margins of the pockets; the improvement that consists in substance deposition means comprising, in combination, means for depositing a measured charge of known concentration of active ingredient less than the volume of one of said pockets into each of said pockets, a supply source for an inactive liquid filler compatible with said active ingredient, means for delivering said liquid to the space between said converging sheets of capsulating material in quantity exceeding that required to fill the remaining unfilled portions of said pockets, and means for returning the excessive quantity of said liquid to said supply source.

11. In a capsulating machine improvement according to claim 10, a pair of nozzles, one located near each extremity of said sheets of capsulating material and at the point of convergence thereof, a vacuum pump connected to said nozzles for picking up excess liquid and returning said liquid to the supply source and a controlled feed line for delivering liquid from said supply source to the space between said sheets.

12. A filling device for use on a capsulating machine having a pair of parallel counter-rotating rollers, at least one of said rollers having a plurality of circumferential rows of die-pockets of definite volume in its periphery, means for feeding a sheet of resilient capsulating material over the surface of each of said rollers and for deforming said capsulating material into said die-pockets, and means for sealing said sheets of capsulating material around the margins of said pockets, said filling device comprising, in combination, a filling nozzle in line with and above each row of die-pockets, means for ejecting a measured charge of active ingredient less in volume than one of the pockets formed in said capsulating material from said nozzle and into each of the said pockets in the associated row of pockets, means to supply an inert liquid compatible with said active ingredient, at a uniform rate into the space between said converging sheets of capsulating material, at a rate in excess of that necessary to fill the remaining portions of said pockets, and means for removing the excess liquid and returning such excess to said supply means.

13. In a device according to claim 12, said means for removing excess liquid consisting in a pair of flattened exhaust nozzles extending between the converging sheets of capsulating material substantially to the point of convergence and located one at each axial extremity of the rollers.

ALFONSO M. DONOFRIO.

REFERENCES CITED

The following references are of record in the file of this patent:

UNITED STATES PATENTS

| Number | Name | Date |
| --- | --- | --- |
| 564,340 | Reed | July 21, 1896 |
| 730,543 | Hance | June 9, 1903 |
| 2,152,101 | Scherer | Mar. 28, 1939 |
| 2,155,445 | Pittenger et al. | Apr. 25, 1939 |
| 2,323,581 | Weckesser | July 6, 1943 |
| 2,379,817 | Mabbs | July 3, 1945 |